United States Patent
Ikeda et al.

(10) Patent No.: US 7,047,720 B2
(45) Date of Patent: May 23, 2006

(54) CABLE OR THE LIKE PROTECTION AND GUIDE DEVICE

(75) Inventors: Masaaki Ikeda, Osaka (JP); Shoichiro Komiya, Osaka (JP); Takayuki Matsuda, Osaka (JP); Kazuo Kishida, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 47 days.

(21) Appl. No.: 10/824,117

(22) Filed: Apr. 14, 2004

(65) Prior Publication Data

US 2004/0250526 A1    Dec. 16, 2004

(30) Foreign Application Priority Data

May 12, 2003    (JP) .............................. 2003-133365

(51) Int. Cl.
    *F16G 13/00* (2006.01)
(52) U.S. Cl. .............................. 59/78.1; 59/900; 248/49
(58) Field of Classification Search ................ 59/78, 59/78.1, 900; 248/49, 51
    See application file for complete search history.

(56) References Cited

U.S. PATENT DOCUMENTS

| | | | | |
|---|---|---|---|---|
| 4,800,714 A | * | 1/1989 | Moritz ........................ | 59/78.1 |
| 4,833,876 A | * | 5/1989 | Kitao et al. .................. | 59/78.1 |
| 4,885,908 A | * | 12/1989 | Stohr ........................ | 59/78.1 |
| 5,771,676 A | * | 6/1998 | Komiya et al. .............. | 59/78.1 |
| 6,176,072 B1 | * | 1/2001 | Weber ........................ | 59/78.1 |
| 6,354,070 B1 | * | 3/2002 | Blase ........................ | 59/78.1 |

FOREIGN PATENT DOCUMENTS

JP    HEI 7-84895    9/1995

* cited by examiner

*Primary Examiner*—David B. Jones
(74) *Attorney, Agent, or Firm*—Woodling, Krost and Rust (57) ABSTRACT

A cable or the like protection and guide device, which can escape static electricity reliably without an antistatic additive and can minimize the generation of wear particles due to sliding contact is disclosed. A cable or the like protection and guide device according to the present invention includes a number of synthetic resin link bodies (11) articulably connected to each other with a cable or the like (10) inserted therein. Each link body comprises a pair of link plates (21) disposed on both sides of the cable or the like and an inner circumferential side connecting plate (22) and an outer circumferential side connecting plate (23) spanned across a bending inner circumferential side and a bending outer circumferential side of the link plate, respectively. Tongue pieces (41 to 44), which are positioned at the front and rear sides of the longitudinal direction of said protection and guide device and sliding contacts, are provided in a protruded manner on at least one of said inner circumferential side connecting plate and said outer circumferential connecting plate, and a metallic member (50) is incorporated in at least one of sliding contact surfaces (41A to 44A) of said tongue pieces.

1 Claim, 5 Drawing Sheets

CABLE OR THE LIKE PROTECTION AND GUIDE DEVICE

TECHNICAL FIELD TO WHICH THE INVENTION PERTAINS

The present invention relates to a cable or the like protection and guide device, and more specifically relates to a cable or the like protection and guide device, which is preferable for accommodating a cable or the like such as a cable or a hose, which connects a movable portion and a stationary portion of an industrial machine, and for protecting and guiding a cable or the like during the movement of the movable portion.

Related Art

Such a cable or the like protection and guide device conventionally comprises a number of link bodies articulably connected to each other. Each link body includes a pair of link plates disposed at regular intervals and an inner circumferential connecting plate spanned across a bending inner circumferential side and an outer circumferential connecting plate spanned across a bending outer circumferential side of the link plate. A cable (cables) or the like is accommodated in a space surrounded by these link plates and connecting plates (see for example Patent Reference 1).

In this cable or the like protection and guide device, even in any case of a linear state and a bent state in the link bodies, the inner circumferential side connecting plate and the outer circumferential side connecting plate of each link body contacts an inner circumferential side connecting plate and an outer circumferential side connecting plate of the adjacent link body, respectively, to close the link bodies tightly.

Patent Reference 1 is Japanese Patent Publication No. Hei. 7-84895.

Problems to be solved by the Invention

However, such a cable or the like protection and guide device may warp during molding. And, warpage and distortion after molding and the like are liable to occur in the outer circumferential side connecting plate and the inner circumferential side connecting plate. When the warp or the like occurs, uniform contact between adjacent connecting plates is impaired and the contact area between the adjacent connecting plates is decreased whereby it becomes difficult for static electricity to escape. When a number of link bodies are connected, this tendency becomes remarkable. Accordingly, the amount of addition of antistatic additive such as carbon powder or carbon fiber, which is added to a synthetic resin forming link bodies, is increased so that the static electricity is surely escaped. However, such a material increases the manufacturing cost of the link body. Additionally wear particles are liable to be generated by sliding contact wear between connecting plates, and the wear particles can be perceived as problems in the use of the device in a clean room.

The object of the present invention is to provide a cable or the like protection and guide device, which can escape static electricity reliably without an antistatic additive and can minimize the generation of wear particles due to sliding contact.

Means for Solving the Problems

To attain the above-mentioned object a cable or the like protection and guide device according to the present invention in which a number of synthetic resin link bodies articulably connected to each other with a cable or the like inserted therein, are each composed of a pair of link plates disposed on both sides of the cable or the like and an inner circumferential side connecting plate and an outer circumferential side connecting plate spanned across a bending inner circumferential side and a bending outer circumferential side of the link plate, respectively, is characterized in that tongue pieces, which are positioned at the front and rear sides of the longitudinal direction of said protection and guide device and sliding contact, are provided in a protruded manner and are located on at least one of said inner circumferential side connecting plate and said outer circumferential connecting plate, and a metallic member is incorporated in at least one of the sliding contact surfaces of said tongue pieces.

Action

According to the cable or the like protection and guide device of the present invention, tongue pieces, which are positioned at the front and rear sides of the longitudinal direction of said protection and guide device and sliding contact, are provided in a protruded manner and are located on at least one of said inner circumferential side connecting plate and said outer circumferential connecting plate, and a metallic member is incorporated in at least one of the sliding contact surfaces of the tongue pieces. Thus, even if a number of link bodies are connected to each other, static electricity can be surely escaped to adjacent link bodies through a metallic member incorporated onto the sliding contact surface, and to the ground from the adjacent link bodies. Accordingly, in the present invention an increase in the amount of addition of an antistatic additive such as carbon powder or carbon fiber or the like is not needed, and a small antistatic additive may be used. Consequently, there is no generation of wear particles due to the sliding contact wear between connecting plates, and even if there is the generation thereof, it is very small.

The invention will be better understood when reference is made to the BRIEF DESCRIPTION OF THE DRAWINGS, DETAILED DESCRIPTION OF THE INVENTION and CLAIMS which follow hereinbelow.

A better understanding of the invention will be had when reference is made to the DETAILED DESCRIPTION OF THE INVENTION and CLAIMS which follow hereinbelow.

DETAILED DESCRIPTION OF THE INVENTION

Embodiments of the Invention

An example of a cable or the like protection and guide device will be described with reference to drawings hereinbelow.

Figure 1:
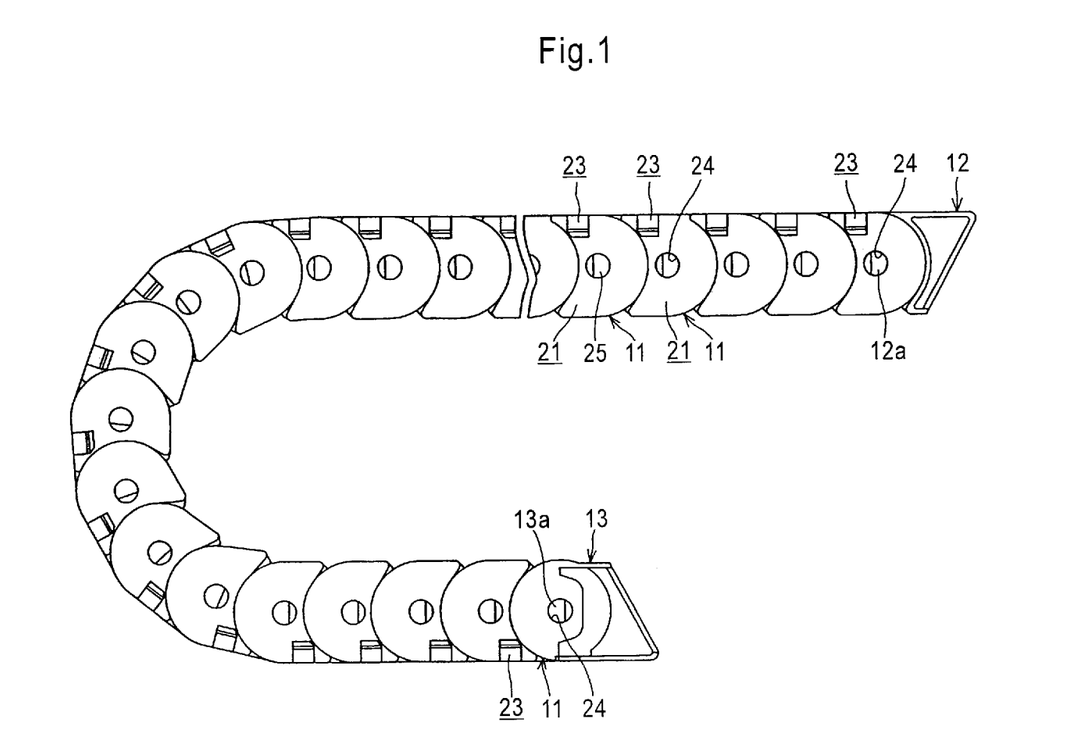
FIG. 1 is a side view showing a first example of a cable and the like protection and guide device according to the present invention.

This cable or the like protection and guide device accommodates a cable or the like 10 in tightly closed manner, and includes a number of link bodies 11, a movable end fitting and a fixed end fitting 13 as shown in FIG. 1.

A number of link bodies 11 are arranged in a row, and each link body 11 is pin-connected to its adjacent link body or bodies 11 so that the link bodies can be in a linear state or a bent state. The movable end fitting 12 is connected to the front end of this row of the link bodies and the fixed end fitting 13 is connected to the rear end thereof.

Figure 5:
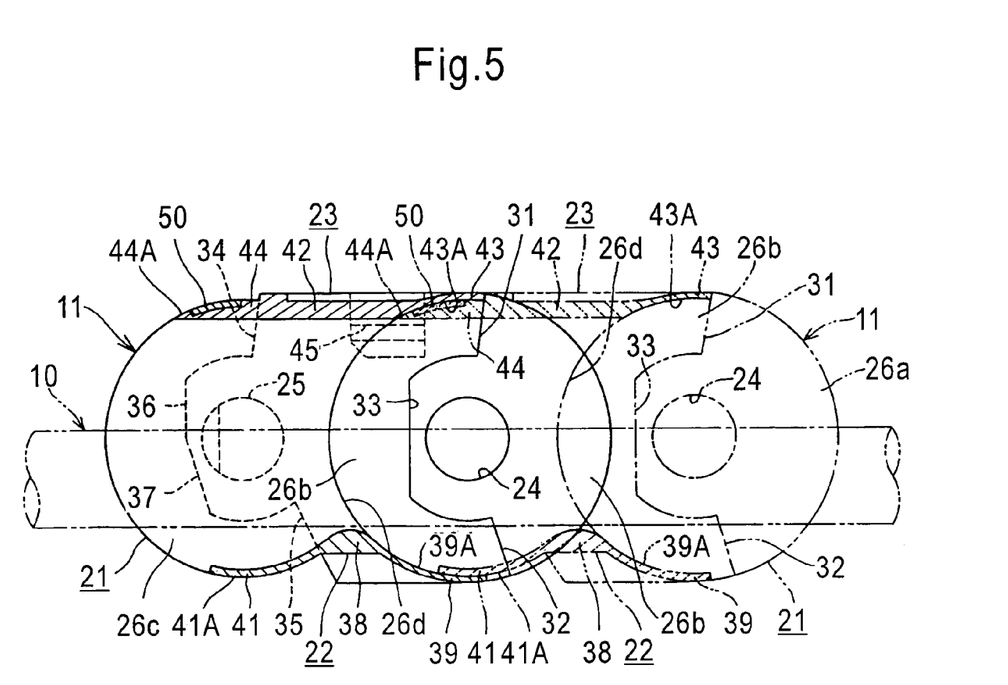
FIG. 5 is a vertical sectional view taken along the line 5—5 in FIG. 4.
Figure 6:
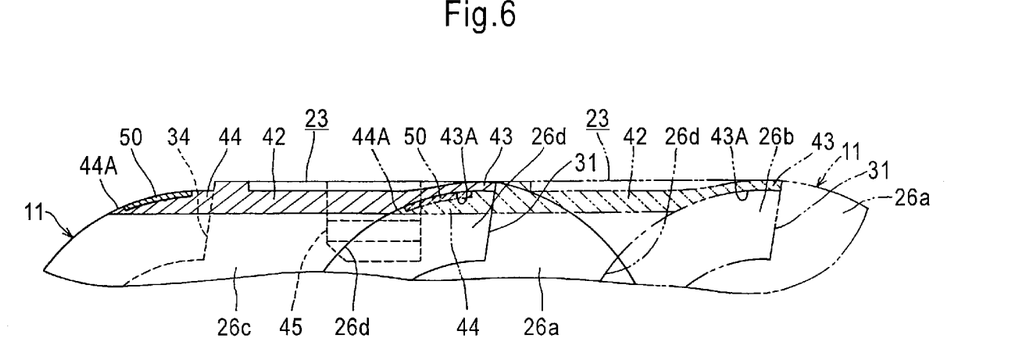
FIG. 6 is vertical sectional view of an enlarged part of FIG. 5.

Each link body 11 includes a pair of link plates 21 and connecting plates 22 and 23, as shown in FIG. 5. The pair of link plates are arranged in parallel with a space. The cable or the like 10 is positioned between the link plates 21 of each link body 11 and is inserted into the link bodies 11. The link plate 22 (hereinafter referred to as an inner circumferential side connecting plate for differentiating from the link plate 23) is arranged between the link plates 21 so as to span across the bending inner circumferential sides of the link plates 21. This inner circumferential side connecting plate 22 is formed as an integral molded product of electric conducting synthetic resin together with the link plates 21. Further, the connecting plate 23 (hereinafter referred to as an outer circumferential side connecting plate) is also composed of an electric conducting synthetic resin molded product, and is arranged between the link plates 21 so as to span across the bending outer circumferential sides of the link plates 21 while being mounted on the link plates removably.

Figure 2:
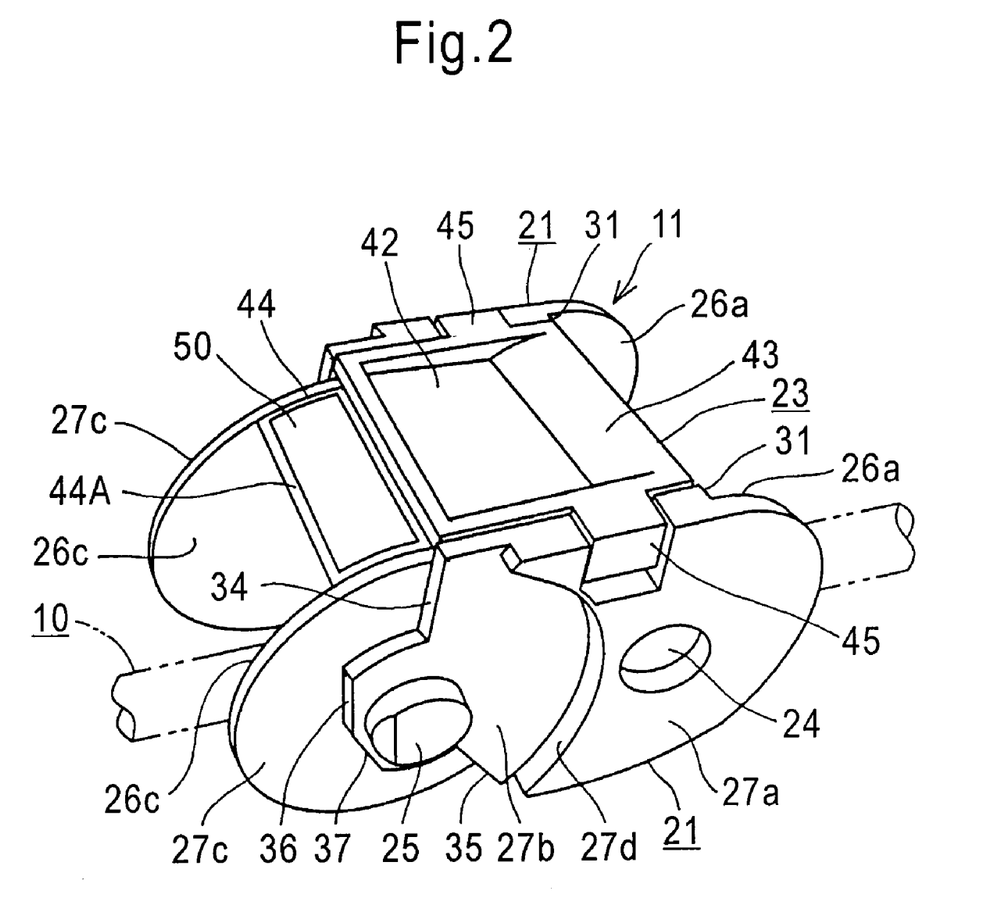
FIG. 2 is a perspective view of a link body forming the cable or the like protection and guide device shown in FIG. 1.
Figure 3:
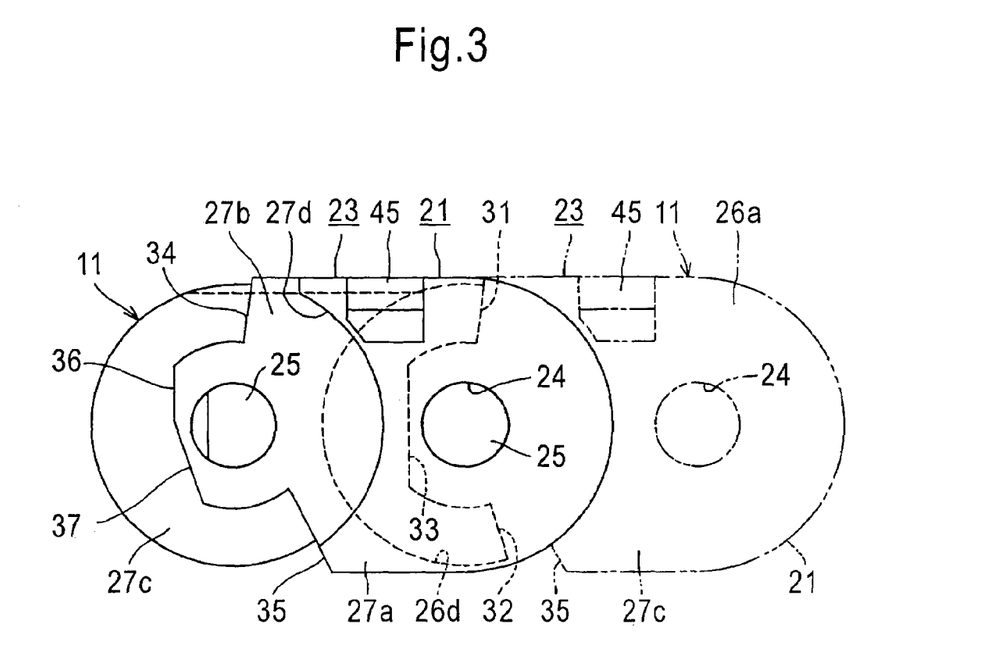
FIG. 3 is a side view of link bodies forming the cable or the like protection and guide device shown in FIG. 1.
Figure 4:
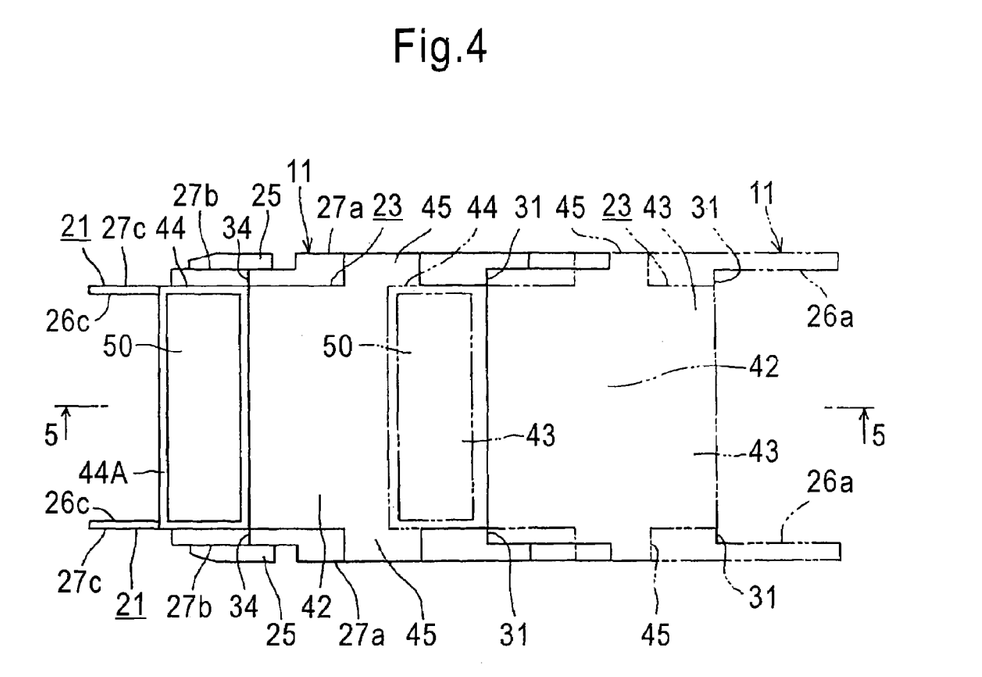
FIG. 4 is a plan view of the link bodies shown in FIG. 2.

The link plate 21 has a cocoon shape when viewed from the side as shown in FIGS. 2 and 3. A front portion of the link plate 21 on the movable end fitting side is provided with a pin hole 24, and a rear portion of the link plate 21 on the fixed end fitting side is integrally provided with a pin 25 having an outer diameter corresponding to the pin hole 24.

The inner surface of the link plate 21 is provided with stepped walls 26a to 26c as shown in FIG. 5. The pin hole 24 is provided in the stepped wall 26a so as to penetrate through it. A rear edge of the stepped wall 26b forms a narrow cylindrical surface 26d coaxial with the pin hole 24. Further, stepped walls 27a to 27c are provided on the outer surface of the link plate 21 as shown in FIGS. 2 and 3. A pin 25 is integrally provided in the stepped wall 27b. A front edge of the stepped wall 27b forms a narrow cylindrical surface 27d coaxial with the pin 25.

The respective link bodies 11 are aligned in a row. The link bodies 11 are connected by respectively fitting the stepped walls 26a and 26b of each link body 11 onto the stepped walls 27b and 27c of the forward adjacent link body 11 and fitting pin hole 24 to the pin 25 of the forward adjacent link body 11 and by respectively fitting the stepped walls 27b and 27c of each link body 11 onto the stepped walls 26a and 26b of the rear adjacent link body 11 and fitting the pin 25 to the pin hole 24 of the rear adjacent link body 11. Therefore, the respective link bodies 11 can be rotated or bent about the pins 25 with respect to their adjacent link bodies 11.

The bending of each link body 11 is limited by bend angle limiting means provided between a rear portion of a link plate 21 and a front portion of the adjacent link body 11.

The bend angle limiting means comprises limiting surfaces 31 to 33 on the front edge of the stepped wall 26b and the rear edge of the stepped wall 27b.

The limiting surfaces 31 and 32 consist of flat surfaces each extending in a radial direction with respect to the center axis of the pin hole 24. The limiting surface 33 consists of a vertical surface. A portion between one end of the limiting surface 33 and the limiting surface 31 and a portion between an opposite end of the limiting surface 34 and the limiting surface 32 are connected by an arc surface coaxial with the pin hole 24.

The limiting surfaces 34 and 35 consist of flat surfaces each extending in a radial direction with respect to the center axis of the pin hole 25. The limiting surface 36 consists of a vertical flat surface and the limiting surface 37 consists of a flat surface parallel to the limiting surface 35.

When the link bodies 11 are in a linear state, the limiting surface 31 of each link body 11 contacts the limiting surface 34 of the front adjacent link body 11, and the limiting surface 33 of each link body 11 contacts the limiting surface 36 of the front adjacent link body 11. When the link body 11 is in a bent state, for example when the link body 11 shown by a solid line in FIG. 5 was rotated counterclockwise, the limiting surface 33 contacts the limiting surface 37 and the limiting surface 32 contacts the limiting surface 35 in the link plate 11. The contact blocks the rotation of the respective link bodies 11. An arc surface, which connects the limiting surface 33 to the limiting surface 31 and an arc surface, which connects the limiting surface 33 to the limiting surface 32 are slightly larger than an arc surface, which connects the limiting surface 36 to the limiting surface 34 and arc surface, which connects the limiting surface 37 and the limiting surface 35 of the front adjacent link body 11.

Further, an inner circumferential connecting plate 22 comprises a body 38, a front side tongue piece 39 and a rear side tongue piece 41. The body 38 is formed in such a manner that a bending outer circumferential side surface is bent and the opposite side surface is substantially flat. The front side tongue piece 39 is a plate member bent toward the bending inner circumferential side and the inner and outer surfaces of the front side tongue piece 39 are arc surfaces coaxial with the pin hole 24. The rear side tongue piece 41 is also a plate member bent toward the bending inner circumferential side, but the inner and outer surfaces of the front side tongue piece 41 are arc surfaces coaxial with the pin hole 25. A radius of the sliding contact surface 39A, which forms an inner surface of the front side tongue piece 39 is slightly larger than that of the sliding contact surface 41A, which forms an outer surface of the rear side tongue piece 41. When the link bodies 11 are connected to each other, the sliding contact surface 39A of the front side tongue piece 39 contacts the sliding contact surface 41A of the rear side tongue piece 41 in the inner circumferential side connecting plate 22. Even if the link body 11 is bent or articulated from a linear state shown in FIG. 5 to the maximum bend angle or more, these sliding contact surfaces 39A and 41A of the tongue pieces 39 and 41 have lengths to maintain its contact.

An outer circumferential side connecting plate 23 includes a body 42, a front side tongue piece 43 and a rear side tongue piece 44 as shown in FIGS. 2 to 6. The body 42 has a plate shape and includes pawls 45 on both side edges of the link plate. The outer circumferential side connecting plate 23 is detachably mounted on the link plate 21 by fitting the pawls 45 into pawl recesses in the link plate 21. The front side tongue piece 43 forms a sliding contact surface 43A on its inner surface, and the rear end tongue piece 44 forms a sliding contact surface 44A on its outer surface. The sliding contact surface 43A consists of an arc surface coaxial to the pin hole 24, and the sliding contact surface 44A consists of an arc surface coaxial to the pin hole 25. However, a radius of the sliding contact surface 43A is slightly larger than that of the sliding contact surface 44A. When link plates 11 are connected to each other the sliding contact surface 43A contacts the sliding contact surface 44A of the outer circumferential side connecting plate 23 of the adjacent link plate 11. Even if the link body 11 is bent or articulated from a linear state shown in FIG. 5 to the maximum bend angle or more, these sliding contact surfaces 43A and 44A have lengths to maintain its contact.

In the cable or the like protection and guide device according to the present invention, a metallic member 50 is buried in the sliding contact surface 44A of the rear end tongue piece 44 forming the outer circumferential side connecting plate 23. The metallic member 50 is composed of a metallic plate and is disposed at the rear end tongue piece 44 of the outer circumferential side connecting plate 23 so that the outer surface of the metallic member 50 coincides with the sliding contact surface 44A. Therefore, when the link bodies 11 were connected to each other, the sliding contact surface 44A of the outer circumferential side connecting plate 23 and the outer surface of the metallic plate 50 are in contact with another sliding contact surface 44A of an outer circumferential side connecting plate 23 of an adjacent link body 11. Even if the link bodies 11 were bent from the linear state shown in FIG. 5 to the maximum, the length of the metallic plate 50 has length to contact the sliding contact surface 44A. The incorporation of the metallic plate 50 into this device is performed by insert-molding when the link plate 21 and the inner circumferential side connecting plate 22 are resin-molded.

This cable or the like protection and guide device is used for protecting and guiding a cable (cables) or the like, which connects a machine tool and its power unit. A cable or the like 10 involves a power cable, which connects a motor on a spindle head to a power unit or a hose, which connects a nozzle for cutting liquid on the spindle head to a cutting liquid tank on the base.

The movable end fitting 12 is made of the same material as the link body 11 as shown in FIG. 1, and a pin 12a in the movable end fitting 12 is fitted to a pin hole 24 of the front end link body 11 and the fitting 12 is bolt-connected to the spindle head. Further, the fixed end fitting 13 is also made of the same material as the link body 11, and a pin 12a in the fixed end fitting 12 is fitted to a pin 13 of the rear end link body 11 and the fitting 13 is bolt-connected to a bead or a column of a horizontal boring machine.

The incorporation of the cable (cables) or the like 10 into the cable or the like protection and guide device is performed by opening the outer circumferential side connecting plates 23 of all link bodies 11, inserting the cable (cables) or the like 10 into the internal space of the link bodies 11 and closing the outer circumferential side connecting plates 23. For example, the grounding of this device is performed by connecting the fixed end fitting 13 or the link body 111 connected to the fixed end fitting 13 to an exclusive ground or a ground of the power unit. Since the link plate 21 and inner circumferential side connecting plate 22 are composed of a electric conducting synthetic resin as described above and the metallic plates 50 on the sliding contact surfaces 44A in the rear side tongue pieces 44 of the outer circumferential side connecting plates 23 of the link bodies 11 is in contact with the sliding contact surfaces 43A in the front side tongue pieces 43 of the outer circumferential side connecting plates 23 of adjacent link bodies 11, the respective link bodies 11 are electrically connected to each other when grounded.

When the spindle head is moved, the link bodies 11 are in a linear state and a bent state in accordance with the stroke, this device adjusts the length of the cable or the like 10 while protecting it. Then static electricity is generated by friction between adjacent link bodies 11, friction between the cable or the like 10 and the link body 11, and friction between cables or the like. Since not only the respective link bodies 11 are made of electric conducting synthetic resin, but also they electrically contacts each other through the metallic plates 50 on the rear side tongue pieces 44 of the outer circumferential side connecting plates 23, charged static electricity escapes to a ground from the fixed end fitting 13 through the adjacent link body 11. Thus, even if the link bodies are connected to each other in a great number, they can be manufactured by a low cost electric conducting synthetic resin. That is static electricity can be surely escaped without a need of an increased amount of an antistatic additive such as carbon fiber or carbon particles.

Further, since the most of the outer circumferential side connecting plates 23 contact the outer circumferential side connecting plates 23 of adjacent link bodies 11 through metallic plates 50 and the contact between the synthetic resins is small, no wear particles are generated, and even if they are generated, they are extremely small and this cable or the like protection and guide device can be safely used in such environment as a clean room. Furthermore, the rigidity of the outer circumferential side connecting plate 23 is increased by the metallic plate 50 and the all link bodies are difficult to flex. Consequently, even if an outer force is exerted the link bodies 11 are not distorted whereby a cable or the like protection and guide device having long life and excellent reliability can be obtained.

The metallic plate 50 can be manufactured by press-molding a metallic sheet for example, and the incorporation of the metallic plate 50 into the link body 11 can be performed by insert molding. Thus the link body can be manufactured without greatly changing the manufacturing steps of a conventional link body, and it can be manufactured at low cost in addition to no necessity of an additive such as carbon fiber or carbon particles.

It is noted that although the metallic plate 50 is incorporated only on the sliding contact surface 44A of the rear side tongue piece 44 in the outer circumferential side connecting plate 23 in the above-explained example, it may be incorporated on the sliding contact surface 43A of the front side tongue piece 43 if necessary. Alternatively, the metallic plate 50 may be incorporated on any one of or both of the sliding contact surface 39A, which is an inner surface of the front side tongue piece 39 and the sliding contact surface 41A, which is an outer surface of the rear side tongue piece 44 in the inner circumferential side connecting plate 22, so that the antistatic effect may be enhanced. Alternatively, the metallic plate 50 is incorporated in the inner circumferential side connecting plate 22 only, and the electric conductivity may be improved by replacing the metallic plate-incorporated inner circumferential side connecting plate 22 with a metallic plate-incorporated outer circumferential side connecting plate 23.

Further, as the metallic plate or member 50 a metallic plate obtained by another processing such as casting may be adopted.

The link bodies 11 are pin-connected to each other, that is the cable or the like protection and guide device has a structure in which each pin 25 of the respective link bodies 11 is fitted to a pin hole 24 of an adjacent link body 11 and the pin hole 24 is fitted to a pin 25 of an adjacent link body 11. However, the present invention is not limited to such a structure only, and other structures may be adopted.

Effects of the Invention

As described above, a cable or the like protection and guide device according to the present invention in which a number of synthetic resin link bodies articulably connected to each other with a cable or the like inserted therein, are each composed of a pair of link plates disposed on both sides of the cable or the like and an inner circumferential side connecting plate and an outer circumferential side connecting plate spanned across a bending inner circumferential side and a bending outer circumferential side of the link plate, respectively, is characterized in that tongue pieces, which are positioned at the front and rear sides of the longitudinal direction of said protection and guide device and sliding contact, are provided in a protruded manner on at least one of said inner circumferential side connecting plate and said outer circumferential connecting plate, and a metallic member is incorporated in at least one of the sliding contact surfaces of the tongue pieces. Thus, even if a number of link bodies are connected to each other, static electricity can be surely escaped to adjacent link bodies through metallic members, and an increase in the amount of addition of an antistatic is not needed. Therefore, a cable or the like protection and guide device can be manufactured at low cost and there is no generation of wear particles due to the sliding contact wear between connecting plates, and even if there is the generation thereof, it is very small. Thus the device of the present invention can be used in a place where a clean environment is required. And the connecting plates are reinforced by metallic members and are difficult to flex so that a cable or the like protection and guide device having high rigidity can be obtained.

Description of Reference Numerals

10 . . . Cable or the like
11 . . . Link body
21 . . . Linkplate
22 . . . Inner circumferential side connecting plate
23 . . . Outer circumferential side connecting plate
24 . . . Pin hole
39 . . . Front side tongue piece of the inner circumferential side connecting plate
39A . . . Sliding contact surface of the front side tongue piece of the inner circumferential side connecting plate
41 . . . Rear side tongue piece of the inner circumferential side connecting plate
41A . . . Sliding contact surface of the rear side tongue piece of the inner circumferential side connecting plate
43 . . . Front side tongue piece of the outer circumferential side connecting plate
43A . . . Sliding contact surface of the front side tongue piece of the outer circumferential side connecting plate
44 . . . Rear side tongue piece of the outer circumferential side connecting plate
44A . . . Sliding contact surface of the rear side tongue piece of the outer circumferential side connecting plate
50 . . . Metallic member (plate)

The invention has been described by way of examples only and those skilled in the art will readily recognize that certain changes and modifications may be made to the examples without departing from the spirit and scope of the appended claims.

We claim:

1. A cable protection and guide device comprising: a number of synthetic resin link bodies articulably connected to each other with a cable inserted therein, each link body comprises a pair of link plates disposed on both sides of said cable, each link plate includes an inner circumferential side and an outer circumferential side, an inner circumferential side connecting plate and an outer circumferential side connecting plate are spanned across said inner circumferential sides and said outer circumferential sides of said link plates, respectively, said inner circumferential connecting plate includes a front side arc-shaped in cross section tongue piece and a rear side arc-shaped in cross section tongue piece, said front side arc-shaped in cross section tongue piece of said inner circumferential connecting plate includes a front side sliding contact surface, said rear side arc-shaped in cross section tongue piece of said inner circumferential connecting plate includes a rear side sliding contact surface, said outer circumferential connecting plate includes a front side arc-shaped in cross section tongue piece and a rear side arc-shaped in cross section tongue piece, said front side arc-shaped in cross section tongue piece of said outer circumferential connecting plate includes a front side sliding contact surface, said rear side arc-shaped in cross section tongue piece of said outer circumferential connecting plate includes a rear side sliding contact surface, and, a metallic member is incorporated in at least one of said sliding contact surfaces of one of said arc-shaped in cross section tongue pieces.

* * * * *

UNITED STATES PATENT AND TRADEMARK OFFICE
CERTIFICATE OF CORRECTION

| | | |
|---|---|---|
| PATENT NO. | : 7,047,720 B2 | Page 1 of 1 |
| APPLICATION NO. | : 10/824117 | |
| DATED | : May 23, 2006 | |
| INVENTOR(S) | : Ikeda et al. | |

It is certified that error appears in the above-identified patent and that said Letters Patent is hereby corrected as shown below:

Column 5, line 62, after "body" delete - 111- and insert -- 11 --.

Column 7, line 46, after "..." delete -Linkplate - and insert -- Link plate --.

Signed and Sealed this

First Day of August, 2006

JON W. DUDAS
*Director of the United States Patent and Trademark Office*